April 18, 1933.   L. D. SOUBIER   1,904,960
GLASS WORKING TANK
Filed June 19, 1931   5 Sheets-Sheet 1
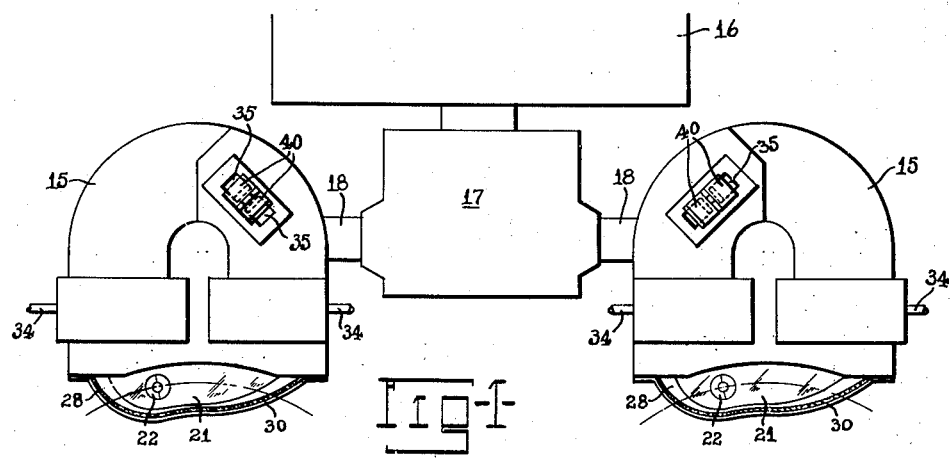
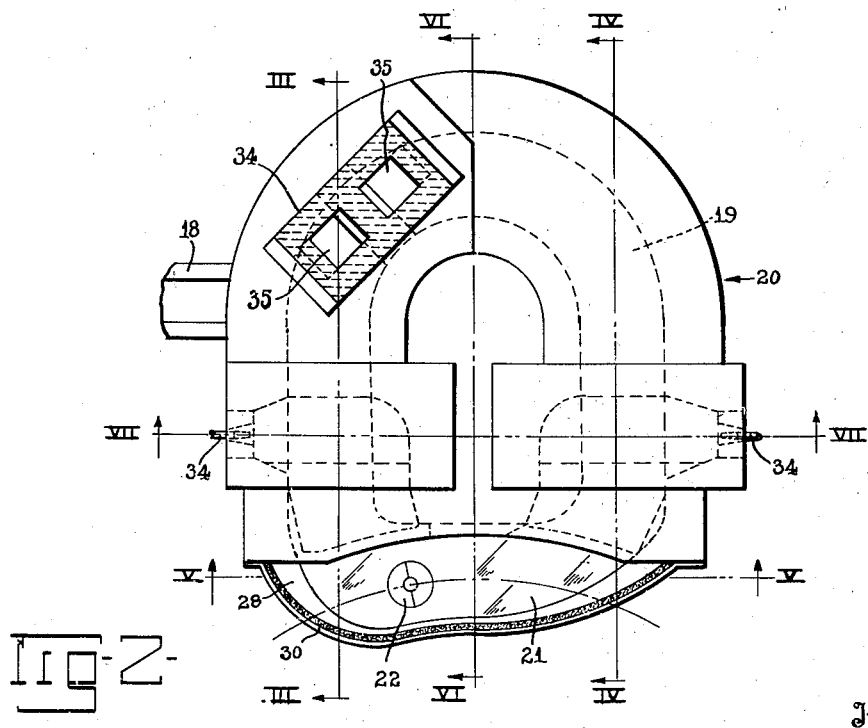
Inventor
Leonard D. Soubier
By J. F. Rule,
Attorney

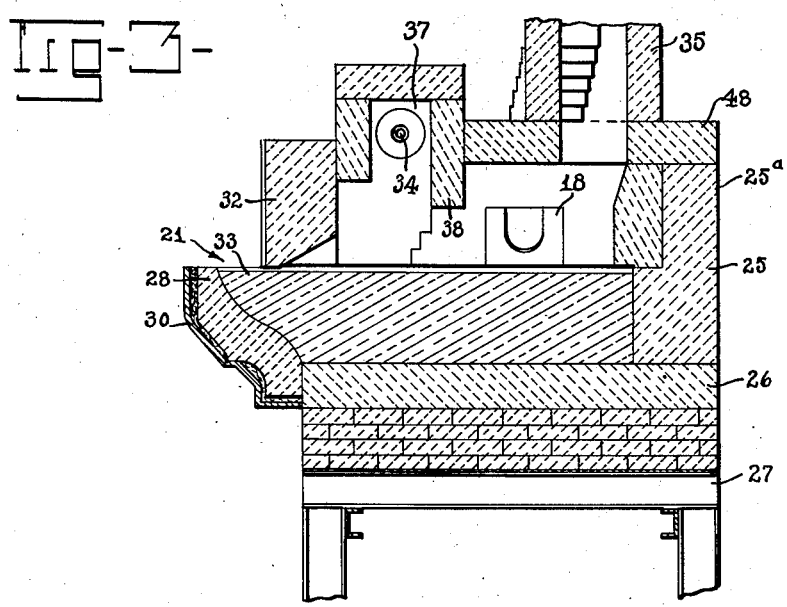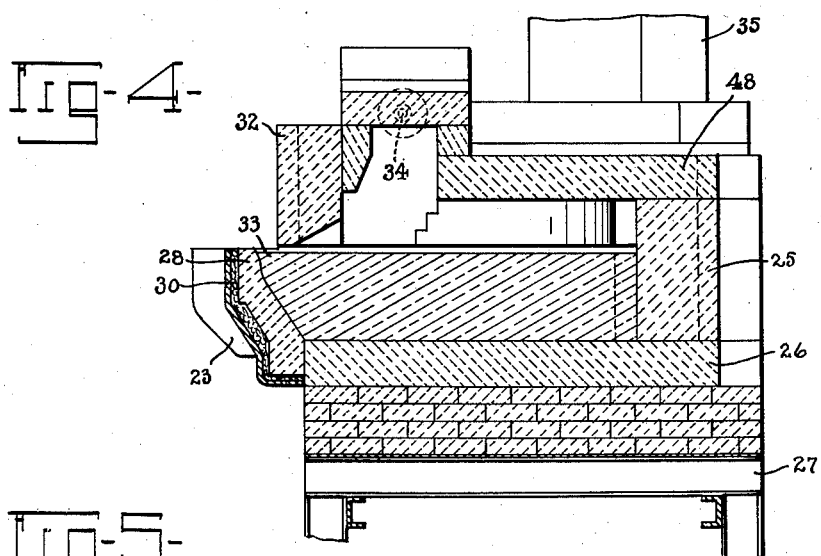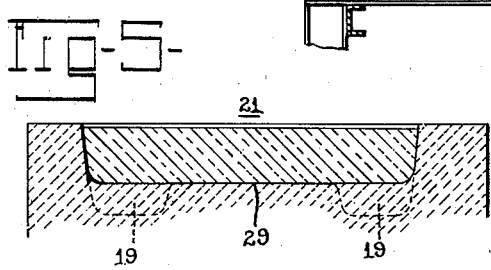

April 18, 1933.     L. D. SOUBIER     1,904,960
GLASS WORKING TANK
Filed June 19, 1931     5 Sheets-Sheet 3
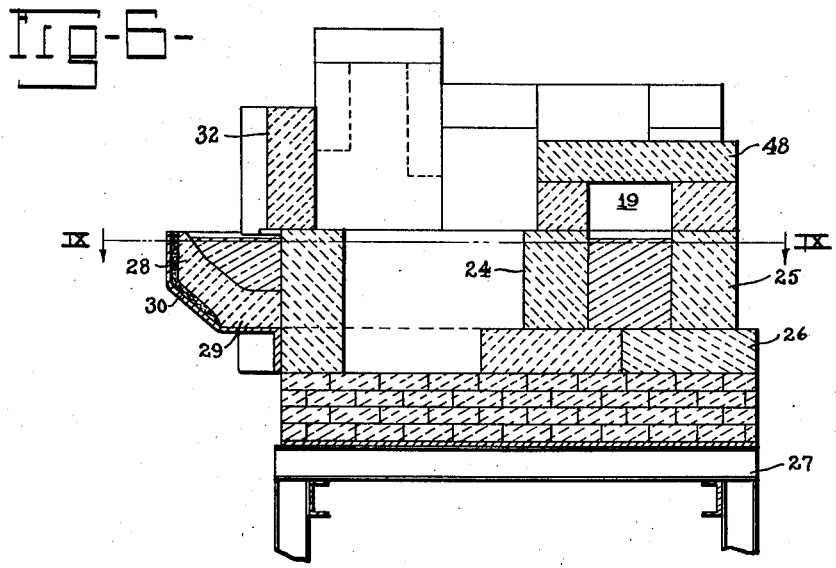
Fig-6-
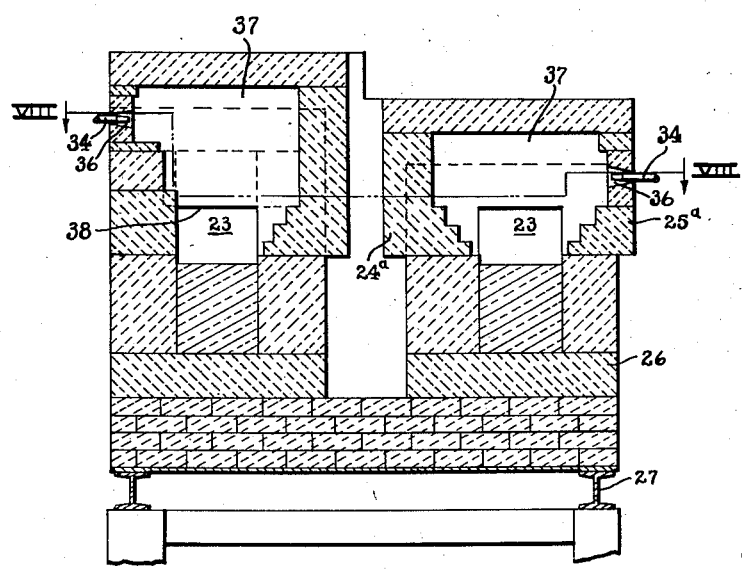
Fig-7-
Inventor
Leonard D. Soubier
By J. F. Rule
Attorney April 18, 1933.  L. D. SOUBIER  1,904,960
GLASS WORKING TANK
Filed June 19, 1931   5 Sheets-Sheet 4
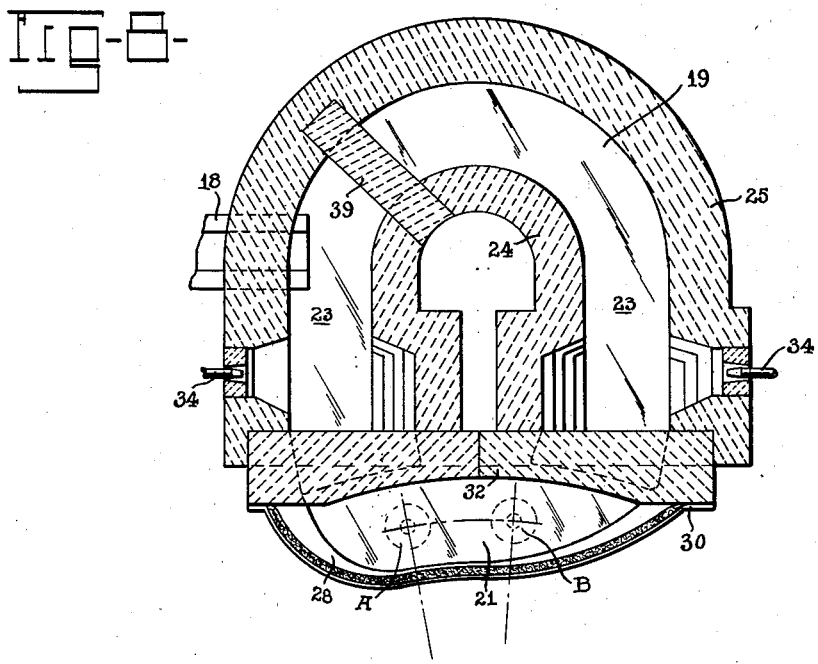
Fig-8-
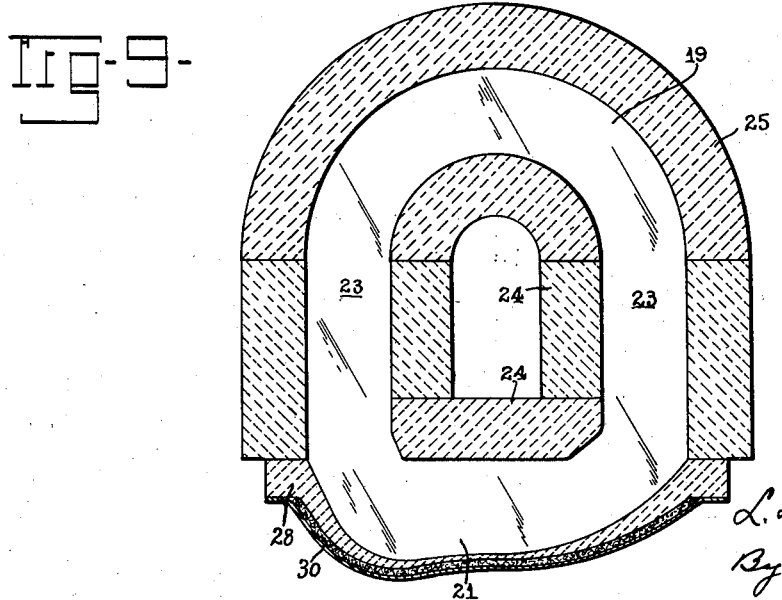
Fig-9-
Inventor
L. D. Soubier
By J. F. Rule
Attorney

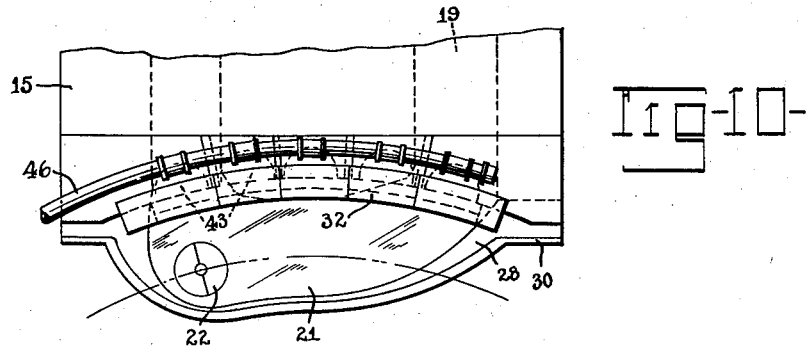
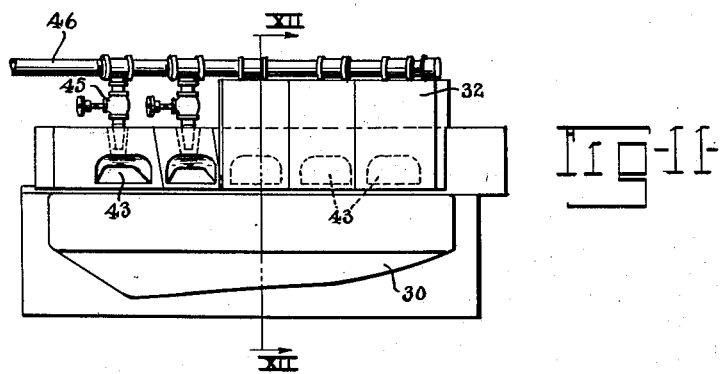
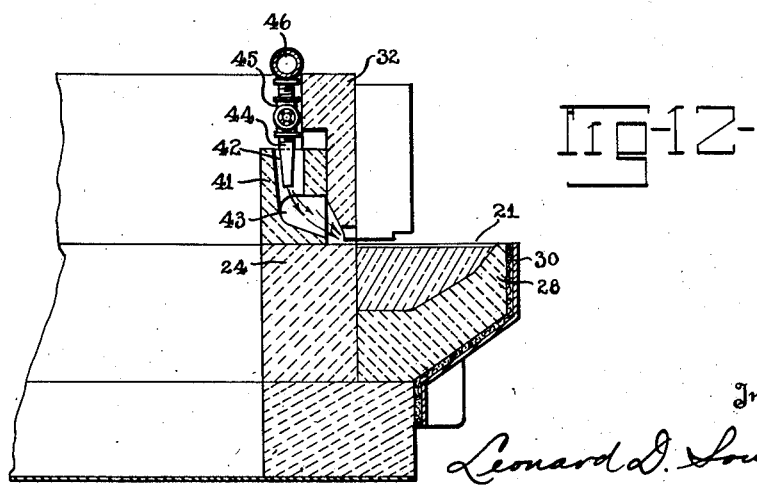

Patented Apr. 18, 1933

1,904,960

UNITED STATES PATENT OFFICE

LEONARD D. SOUBIER, OF ALTON, ILLINOIS, ASSIGNOR TO OWENS-ILLINOIS GLASS COMPANY, A CORPORATION OF OHIO

GLASS WORKING TANK

Application filed June 19, 1931. Serial No. 545,501.

The present invention relates to improvements in glass working tanks and more particularly to means for delivering molten glass to an open trough or "gathering area" from which mold charges are gathered by suction molds or other similar implements.

In the modern "shop" including among other equipment, a forming machine provided with suction type blank molds, a revolving pot is ordinarily employed to constantly bring fresh molten glass to the mold charging position or "gathering area". Attempts to eliminate the revolving pot and thereby greatly reduce operating expenses through the adoption of a working tank including a stationary trough or the like, have for the greater part met with complete failure. In the comparatively few instances where machines have to some extent been operated in conjunction with stationary troughs the quality of the glassware produced has been considerably below that considered acceptable commercially. The principal factors working against successful operation of stationary troughs have been, first, the extreme difficulty in maintaining constant and sufficient movement of the glass past the point at which the gathering molds obtain their mold charges to insure the presence of fresh glass in this zone at all times, and second, the difficulty in maintaining proper and uniform temperature conditions in the glass delivered to the mold charging position.

An object of the present invention is the provision of a stationary working tank including a continuous channel of unusual depth throughout its length, said channel having an exceptionally small exposed "gathering area" to permit suction gathering therefrom of mold charges. Due to the depth of the channel, a sufficient amount of glass may be contained therein to greatly assist in the maintenance of proper temperature conditions. Also by holding to a minimum the exposure of the glass to the chilling effect of the outside air, radiation of heat from the glass is greatly reduced.

Another object is the provision, in a stationary working tank of the above character, of novel means for effectively applying a heating medium to the surface of the glass in the channel. To this end burners or injectors are arranged in proximity to the exposed or "gathering area" for introducing a fuel mixture into the space immediately above the glass in the channel. The construction includes exhaust stacks through which a natural draft may operate to cause movement of the burning fuel over the surface of the glass.

A further object is the provision of novel means for applying heat directly to the surface of the glass in the exposed or "gathering area". To this end the "jack arch" or vertical wall defining the inner margin of the "gathering area" is provided with a plurality of burners so arranged that a localized heat may be regulably applied to the glass in said area thereby assisting materially in maintaining proper temperature conditions in the glass about to be gathered and melting down excess glass which is severed from the gathered mold charges.

Other objects will be in part apparent and in part pointed out hereinafter.

In the drawings:

Fig. 1 is a plan view showing one of many possible embodiments of my invention in a modern "shop."

Fig. 2 is a detail plan view of one of the stationary working tanks.

Fig. 3 is a vertical sectional view taken substantially along the line III—III of Fig. 2.

Fig. 4 is a vertical sectional view taken substantially along the line IV—IV of Fig. 2.

Fig. 5 is a sectional view taken substantially along the line V—V of Fig. 2 showing the general shape of the bottom wall of the channel in the gathering area.

Fig. 6 is a sectional view taken substantially along the line VI—VI of Fig. 2.

Fig. 7 is a sectional view taken substantially along the line VII—VII of Fig. 2.

Fig. 8 is a horizontal sectional view taken along the line VIII—VIII of Fig. 7.

Fig. 9 is a sectional view taken along the line IX—IX of Fig. 6.

Fig. 10 is a plan view showing another form of the invention including means for applying a heating medium to the glass in the gathering area.

Fig. 11 is a front elevation thereof.

Fig. 12 is a sectional view taken substantially along the line XII—XII of Fig. 11.

In more or less general terms the present invention comprises a novel arrangement of stationary working tanks 15 about the delivery end of a glass melting furnace 16, whereby a single furnace may serve a comparatively large number of forming machines. Preferably a refining chamber 17 is connected to the furnace 16 and in turn communicates through troughs 18 or spouts, with the individual working tanks 15. Each working tank comprises a continuous channel 19, a major portion of which is enclosed in a heating chamber 20, the latter provided with means whereby the temperature of glass contained in and flowing through the channel 19 may be regulated and controlled. That portion of the channel or trough 19 which is not enclosed in the heating chamber 20, provides a "gathering area" 21 where suction blank molds 22 of a bottle forming machine (not shown) obtain their mold charges. The channel or trough 19 is of exceptional depth throughout its length thereby providing means to accommodate a considerable quantity of molten glass which, together with the direct application of heat to the glass within the chamber 20, materially facilitates maintenance of the desired and necessary temperature conditions in the glass.

Each working tank 15 comprises an upwardly facing channel 19 a portion of which is substantially U-shaped in plan with the forward ends of the arm portions 23 connected to the opposite ends of the gathering area 21. The channel 23 or trough comprises inner and outer vertical walls 24 and 25 respectively, rising from a floor 26 which is mounted at the upper end of a supporting frame 27. In providing the gathering area 21 the front wall 28 and floor 29 thereof are supported in a metal frame 30 which is attached to the main structure. At the left end of the gathering area 21 (Figs. 2, 8, and 9) its width is considerably greater than at the other end for the reason that the gathering molds are lowered into contact with the glass at said left end of the gathering area and are removed from contact with the glass shortly after passing the center of said area. In Fig. 8, "A" represents substantially the point at which the charging operation begins and "B" the point at which the gathering mold is removed from contact with the glass. Thus it is evident that the exposed area to the right of point "B" may well be of considerably less width than the left end of the gathering area with the result that loss of heat by radiation is materially reduced. The front wall 28 substantially midway the length thereof, may be curved to conform with the path of travel of the molds of a forming machine (not shown). The floor 29 in the gathering area (Fig. 5) is at a somewhat higher elevation than the bottom of the main channel 19. Such a condition is necessary in order that sufficient clearance may be provided for the finishing molds, which during operation of a machine move quite close to the lower side of said floor. In order to provide such clearance and at the same time give the floor the necessary thickness, the construction shown in Fig. 5 has been embodied in the working tank.

By means of the heating chamber 20 referred to heretofore, excessive loss of heat in the glass by radiation is prevented and in addition there is provided means for effectively applying additional heat to the glass in the channel 19. The construction involved includes upward extensions 24$^a$ and 25$^a$ on the inner and outer walls of the channel 19 and a roof 48 or cover blocks, connecting the upper ends of the extensions 24$^a$ and 25$^a$ and therewith forming the chamber which is of the same shape as the channel 19. A "jack arch" 32 comprising vertically disposed blocks of refractory material, is arranged at the front end of the working tank so that it closes the two ends of the heating chamber 20. Preferably this "jack arch" has its lower side disposed quite close to the upper surface of the glass 33 to thereby minimize outflow of heat from the chamber and inflow of cold outside air to the latter. Through the construction just described, it will be noted that both the inner and outer walls 24 and 25 of the channel 19 are exposed to the outside air. Thus substantially uniform temperature conditions will be maintained in both walls with the result that one sided chilling of the stream of glass flowing through the channel may be avoided without difficulty.

For the purpose of regulating and controlling the temperature of the glass in the channel 19 to meet various operating conditions, apparatus for applying heat to the surface of the glass is embodied in the heating chamber construction. This apparatus includes a pair of burners 34 arranged in proximity to the ends of the U-shaped chamber and exhaust stacks 35 individual to said burners. The burners 34 extend into ports 36 in individual combustion chambers 37 which are provided in the upper side of the heating chamber 20. One wall 38 of the combustion chamber 37 at the left side of the working tank (Figs. 2 and 3) extends downward a sufficient distance to insure intimate contact of the injected heat with the surface of the glass in the channel during its movement to the stack 35. Such downward extension of the wall 38 in this portion of the chamber is necessary because of the presence of the trough or spout 18 and consequent raising of the roof of the chamber at this point. At the other end of the chamber 20, the roof 48 is disposed at the same elevation as the lower end of said wall 38 so that the applied heat is held in contact with the glass during its movement to the stack. The two stacks 35 are arranged side by side and separated from each other by a vertical wall 39 which extends downwardly below the inlet ends of the stacks to a point quite close to the surface of the glass. The wall in effect, divides the chamber into two compartments. This arrangement, together with dampers 40, individual to the stacks, permits accurate control of temperature conditions in the chamber. For example, the glass flowing into the tank 19 through the trough 18 or spout, may not require additional heating. Under these conditions the burner 34 adjacent the trough 18 will not be operated. At the same time the glass after having been exposed to the outside air during its movement through the gathering area 21 will quite likely require reheating. Accordingly, the burner 34 adjacent the right end of the gathering area will be operated with the result that heat will be applied to the surface of the glass up to the partition or wall 39. Adjustment of the dampers 40 will quite obviously determine to a considerable degree the effectiveness of the applied heat in that the rate of flow of heat over the glass will be thereby regulated and controlled.

In operation the supply of glass is obtained from the melting furnace 16 by way of the chamber 17 and spout 18 or trough. The temperature of the glass flowing into the channel 19 together with the temperature required will determine whether or not one or both of the burners should be operated. As the molds 22 are brought in succession to the point "A" (Fig. 8), they dip into the glass and remain in contact therewith until they have reached substantially the point "B". Such travel of the molds in the glass together with their removal by suction of measured quantities of the glass, will cause circulation of the glass lengthwise of the gathering area 21 and the enclosed channel 19. Thus fresh glass will at all times be presented at the gathering area and ideal conditions for the mold charging operation maintained.

In Figs. 10, 11, and 12, there is disclosed an effective means for applying a localized heat to the gathering area 21. This means includes a series of burner blocks 41 which are mounted on the walls 24 and 25 of the channel 19 rearwardly of the jack arch 32. Each burner block includes a vertical port 42 communicating with a combustion chamber 43 which opens forwardly beneath the jack arch 32. A burner 44 projects into each port 42 and is provided with a valve 45 by means of which the flow of fuel to the burner may be controlled. All of these burners are connected to a main supply pipe 46 disposed in proximity to the upper side of the jack arch 32.

An arrangement of the burners such as described above provides means whereby a localized heat may be applied to practically any portion of the gathering area 21 to the exclusion of the other portions. Thus if the glass entering the gathering area is in proper condition to be worked, those burners adjacent the inlet to said gathering area may be shut off. At the other end of the gathering area the burners may be operated for the purpose of melting down the excess glass severed from the mold charges. In this way effective and complete reheating of the glass prior to its return to the gathering area may be greatly facilitated.

Modifications may be resorted to within the spirit and scope of the appended claims.

What I claim is:

1. A stationary working tank comprising a continuous upwardly facing channel including a major portion of substantially U-shape, means for delivering molten glass to the channel, a substantially U-shaped heating chamber disposed over said major portion of the channel and providing a gathering area from which mold charges may be obtained, a wall dividing said heating chamber into separate compartments, combustion chambers arranged at the opposite ends of the heating chamber and both in proximity to the gathering area, burners arranged to introduce a fuel mixture into said combustion chambers, and exhaust stacks individual to the compartments arranged at opposite sides of said wall and closely adjacent thereto.

2. A stationary glass working tank comprising a continuous upwardly facing channel, means for delivering glass to the channel, a cover arranged over a major portion of the channel and spaced a short distance thereabove, means for supplying heat and injecting it into the space between the cover and surface of the glass in the channel, stacks through which the heat is withdrawn from said channel, said stacks being so located that the injected heat is caused to flow in one direction beneath a portion of the cover and in an opposite direction beneath another portion thereof.

3. In a stationary glass working tank, a continuous upwardly facing channel including a substantially U-shaped portion, means for delivering glass to the channel, a jack arch spanning the ends of said U-shaped portion and defining the inner margin of a gathering area, a cover extending over the U-shaped portion of the channel and cooperating with the jack arch in forming a heating chamber, and means for supplying heat to said chamber.

4. In a stationary glass working tank, a continuous upwardly facing channel including a substantially U-shaped portion, means for delivering glass to the channel, a jack arch spanning the ends of said U-shaped portion and defining the inner margin of a gathering area, a cover extending over the U-shaped portion of the channel and cooperating with the jack arch in forming a heating chamber, means for supplying heat to said chamber, a vertical wall dividing the heating chamber into two compartments, an exhaust stack for each compartment arranged in proximity to said wall, and means individual to the compartments for supplying heat thereto.

5. In a stationary glass working tank, a continuous upwardly facing channel including a substantially U-shaped portion, means for delivering glass to the channel, a jack arch spanning the ends of said U-shaped portion and defining the inner margin of a gathering area, a cover extending over the U-shaped portion of the channel and cooperating with the jack arch in forming a heating chamber, a plurality of burner blocks arranged alongside the jack arch and having combustion chambers opening toward the gathering area, and burners individual to the burner blocks.

6. The combination of an upwardly facing trough providing a gathering area from which mold charges of molten glass may be obtained, means for supplying glass to the trough, a jack arch defining the inner longitudinal margin of the gathering area, a plurality of burner blocks associated with the jack arch and having combustion chambers opening toward said gathering area and in part disposed beneath the jack arch, and means for supplying a fuel mixture to the combustion chambers.

7. The combination of an upwardly facing trough providing a gathering area from which mold charges of molten glass may be obtained, means for supplying glass to the trough, a jack arch defining the inner longitudinal margin of the gathering area, a plurality of burner blocks associated with the jack arch and having combustion chambers opening towards said gathering area and in part disposed beneath the jack arch, and burners individual to the blocks for supplying a fuel mixture to the combustion chambers.

Signed at Alton, Illinois, this 16th day of June 1931.

LEONARD D. SOUBIER.